UNITED STATES PATENT OFFICE.

SAMUEL R. PERCY AND WALTER S. WELLS, OF NEW YORK, N. Y., ASSIGNORS TO GEO. R. PERCY AND WALTER S. WELLS, OF SAME PLACE.

IMPROVED PROCESS FOR OBTAINING A CONDENSED EXTRACT OF HOPS.

Specification forming part of Letters Patent No. 46,973, dated March 21, 1865.

*To all whom it may concern:*

Be it known that we, SAMUEL R. PERCY and WALTER S. WELLS, both of the city, county, and State of New York, have invented a new and useful Process for Obtaining the Condensed Extract of Hops; and we do hereby declare the following to be a full and complete description of the same.

Our invention consists in the preparation of a condensed extract of hops, which possesses all the valuable properties of the hops, which is more easy of transportation, less bulky in storage, and which is capable of being kept for many years in air-tight packages or vessels, thus forming a valuable and important article of merchandise.

Hops in their original state are bulky as compared with their essential elements; are liable to injury in the process of drying or from exposure to moisture, and are extremely sensitive to all odors, frequently retaining that of the bilge after a sea voyage, thus making all the exportation hazardous; and even under the most favorable circumstances they are computed to lose about thirty-three and one-third per cent. of their strength the first year, and afterward to decline more rapidly. All these and other objections are entirely obviated by our invention.

In the usual process of manufacturing ale, beer, porter, and other malt liquors, the hops themselves are added to the wort while boiling, and boiled therein from one to four hours, the vessel containing the same being more or less uncovered during the process, and allowing the escape, by evaporation, of the volatile elements of the hops, in consequence of which much of the fine flavor and aroma of the plant is lost. By our invention this waste of the volatile principles of the plant is prevented, the condensed extract of hops being made in such manner that the hops are not allowed contact with the air from the time they are put into the vacuum apparatus, as hereinafter described, until the process of condensation is completed, and as the wort in the process of brewing in accordance with our invention does not require to be heated above ninety degrees, and often not higher than sixty degrees, there is no danger of volatilization of the hops at said temperature.

To enable others to make and use our invention, we will now proceed to describe the mode adopted by us for preparing the condensed extract of hops.

A quantity of hops is placed in an air-tight vessel, and the air is then exhausted therefrom in any of the methods ordinarily used for that purpose. Warm or cold water is then introduced, which should be kept heated by the admission of steam, and the hops allowed to steep for two or three hours. The degree of heat is not essential. We prefer that it should approach nearly to the boiling-point of water in vacuo. A small quantity of alkali or alkaline salts should be added to the water, the amount, when so used, not to exceed one pound of alkali or its equivalent of alkaline salts to every one hundred pounds of hops. When the hops, by these means, are sufficiently digested, a vacuum is formed in a chamber communicating with the vessel in which the hops have been steeped, so that when the cocks communicating between this vessel and this receiver are opened the water and condensed steam containing the virtues of the hops pass through into the receiver, a vacuum being maintained therein sufficient to draw all the liquid from the hops. Water and steam are again and again admitted into the steeping-vessel, as before described, until the hops are entirely exhausted of their properties. The fluid thus holding said properties in suspension is strained through a suitable strainer adjusted within the connecting-pipe while *in transitu* from the steeping-vessel to the receiver. When a sufficient quantity of this fluid extract of the hops, effected as above stated, is accumulated in the receiver, a vacuum evaporating-pan is ready for its reception by covering or coating its inner surface with any oily or fatty substance—cerine, paraffine, &c.,—to prevent the extract from adhering to the pan and burning. A vacuum is then formed in this pan and the fluid extract is drawn through a pipe or tube connecting with the receiver, as fast as needed, into this vacuum, evaporating, or condensing pan. At such time, during the process of evaporating and condensing such fluid, as the operator may deem proper, a quantity of molasses, saccharine matters, or the extracted liquor of grain, whether malted or not, is to be drawn into the vacuum condenser and mixed with the fluid therein contained, amounting in quantity to about three gallons of molasses or its equivalent proportion of saccharine matter or extracted liquor of grain to every one hundred pounds of hops employed, though these proportions are by no means arbitrary. The whole is then evaporated or condensed to the consistence of very thick molasses, after which it may be taken out and put into vessels for use or transportation.

The extract of hops being thus prepared, it is contemplated to have attached to each package thereof printed directions as to the proportions of said extract which will be equivalent to a certain number of pounds of hops as used heretofore in the manufacture of malt liquors, and which shall guide the brewer in carrying out the designs of our invention, said designs being to enable manufacturers of malt and other liquors in which hops are used to offer to consumers the very best articles so prepared, the molasses, saccharine matter, or extracted liquor of grain forming a sufficient body to the extract to hold in suspension and unity the essential extractive elements of the hops so treated, and thereby preserving them from oxidation and destruction, and also exercising an antiseptic or preservative action on the extract, and shielding it from the influence of the atmosphere, and thus preventing oxidation and fermentation.

We claim as our invention and desire to secure by Letters Patent—

1. The process of making a condensed extract of hops by a continuous vacuum and exhaustion, whether with or without the addition of alkali or alkaline salts, molasses, saccharine matter, or the extracted liquor of grain, or with or without the addition of one or all of these, such process being vastly superior to any other, and contains the fine aroma of the hops, which is entirely lost and dissipated when made in the open air.

2. The use of steam in the steeping-vessel to exhaust the properties and virtues of the hops.

3. The use of alkali or alkaline salts in the water or steam used in extracting the essential qualities of the hops, as it tends to make the resin of the hops more soluble, and also counteracts the acid in the molasses.

4. The process of coating or covering the inner surface of the vacuum condensing-pan with any oily or fatty substance to prevent burning, &c.

5. The commingling of a sufficient quantity of molasses, saccharine matter, or the extracted liquor of grain, whether malted or not, to the watery extract of hops.

In testimony whereof we have hereunto subscribed our names this 9th day of January, 1865.

SAML. R. PERCY.
WALTER S. WELLS.

Witnesses:
GRATZ NATHAN,
GILBERT PERCY.